United States Patent [19]

Losacco et al.

[11] Patent Number: 5,184,471
[45] Date of Patent: Feb. 9, 1993

[54] FOOD PRODUCTS CHILLER AND METHOD OF USING THE SAME

[75] Inventors: Donald L. Losacco, Algonquin; Donald L. Catton, Darien, both of Ill.

[73] Assignee: OCS Industries, Inc., Omaha, Nebr.

[21] Appl. No.: 726,856

[22] Filed: Jul. 8, 1991

[51] Int. Cl.⁵ .............................................. F25D 13/06
[52] U.S. Cl. .................................... 62/63; 62/85; 62/264; 62/375; 62/381; 62/474
[58] Field of Search ............... 62/264, 375, 381, 63, 62/474, 85; 422/120

[56] References Cited

U.S. PATENT DOCUMENTS 4,577,466  3/1986  Cunningham .................... 62/375
4,827,727  5/1989  Caracciolo ...................... 62/264

OTHER PUBLICATIONS

Snowball, M. R. et al, "*Purification of Water Supplies Using Ultraviolet Light*" pp. 46-53 of Waste Water Disinfection—A State of the Art Report, by the Water Pollution Control Federation, Alexandria, Va. 1984.

*Primary Examiner*—Ronald C. Capossela
*Attorney, Agent, or Firm*—Zarley, McKee, Thomte, Voorhees & Sease

[57] ABSTRACT

A food products chiller and method of using the same as provided. The chiller includes a container for receiving and holding the food product, a cooling station for cooling liquid coolant, an ultraviolet radiation station for reducing the microbial contaminants in the coolant, and a circulation system for circulating the coolant from the cooling station to the container, from the container to the ultraviolet radiation station, and from the ultraviolet radiation station to the cooling station for reintroduction into the container for cooling additional food products. In the chilling method, the food products are chilled by exposure to the coolant liquid as the drum rotates. The liquid is drained from the drum, filtered and subjected to ultraviolet radiation so as to kill the microbial contaminants in the coolant. The coolant is then recirculated to the cooling station for re-cooling and re-introduction into the drum for chilling additional food products.

36 Claims, 2 Drawing Sheets

FOOD PRODUCTS CHILLER AND METHOD OF USING THE SAME

BACKGROUND OF THE INVENTION

Raw, processed, and packaged food products oftentimes need to be cooled to prevent spoilage thereof. Chillers have been used at packing plants for cooling by-products so as to prevent spoilage thereof. One type of packing plant chiller includes a rotatable drum through which the by-products are tumbled while being exposed to a liquid coolant introduced into the drum. For example, see U.S. Pat. Nos. 4,769,435, 4,700,546, 4,578,957, and 4,577,466. In these patents, the liquid coolant is filtered, re-cooled, and recirculated to the rotating drum for cooling additional by-products.

Chillers of the type disclosed in the above-referenced patents, while useful for chilling by-products cannot be used for chilling food products which are intended for human consumption due to the presence of microbial contaminants such as bacteria and fungi. Such contaminants which are present on the food product would grow and multiply to unacceptable and unsafe levels in the liquid coolant solution as it is recycled and recirculated. Thus, the coolant cannot be recirculated without first purifying or sterilizing the coolant. The use of new or fresh coolant for each batch of food products would be costly and wasteful.

Therefore, a primary objective of the present invention is a provision of an improved food products chiller and method of using the same.

Another objective of the present invention is the provision of a chiller for edible food products which disinfects and recirculates the liquid coolant.

Still another objective of the present invention is the provision of a method and means for controlling microbial contaminants in a chilling solution.

A further objection of the present invention is the provision of a method and means for chilling food products wherein ultraviolet radiation is used to control the microbial contaminants in the cooling solution.

Another objection of the present invention is the provision of an apparatus and method for chilling food products which rapidly, efficiently and uniformly cools the products.

Yet another objective of the present invention is the provision of a food products chiller which can be cleaned in place.

A further objective of the present invention is a provision of a method and means of chilling food products which minimizes energy and coolant consumption.

Another objective of the present invention is a provision of a food products chiller which is economical to manufacture, and durable, safe, and efficient in use.

These and other objectives will become apparent from the following description of the invention.

SUMMARY OF THE INVENTION

The chiller of the present invention can be used to chill edible or inedible products, whether raw, processed, or packaged. The chiller includes a rotatable drum having an inlet opening at one end and an outlet opening at the other end. The warm products are introduced into the inlet opening of the drum and tumbled therein as the drum rotates. Spiral or helical flighting in the drum moves the product from the inlet opening to the outlet opening. As the products move through the drum, they are exposed to a liquid coolant which is introduced into the drum. While the products are exposed to the liquid cooling solution, either in the form of a spray or an immersion bath, or a combination of both, the coolant absorbs heat from the products such as the products are cooled. The products are then dewatered near the outlet end of the drum before exiting through the outlet opening thereof.

The coolant is drained near the downstream end of the drum into a filter which removes solid particles. For purposes of edible food products, the coolant is then subjected to ultraviolet radiation which kills microbial contaminants, such as bacteria and fungi, which have been transmitted to the coolant solution from the food products. After being disinfected by the ultraviolet radiation, the coolant is re-cooled and recirculated to the drum for cooling additional products.

BRIEF DESCRIPTION OF THE DRAWINGS

FIG. 3 is a schematic view showing the circulation system of the chiller of the present invention.

DETAILED DESCRIPTION OF THE DRAWINGS

Figure 1:
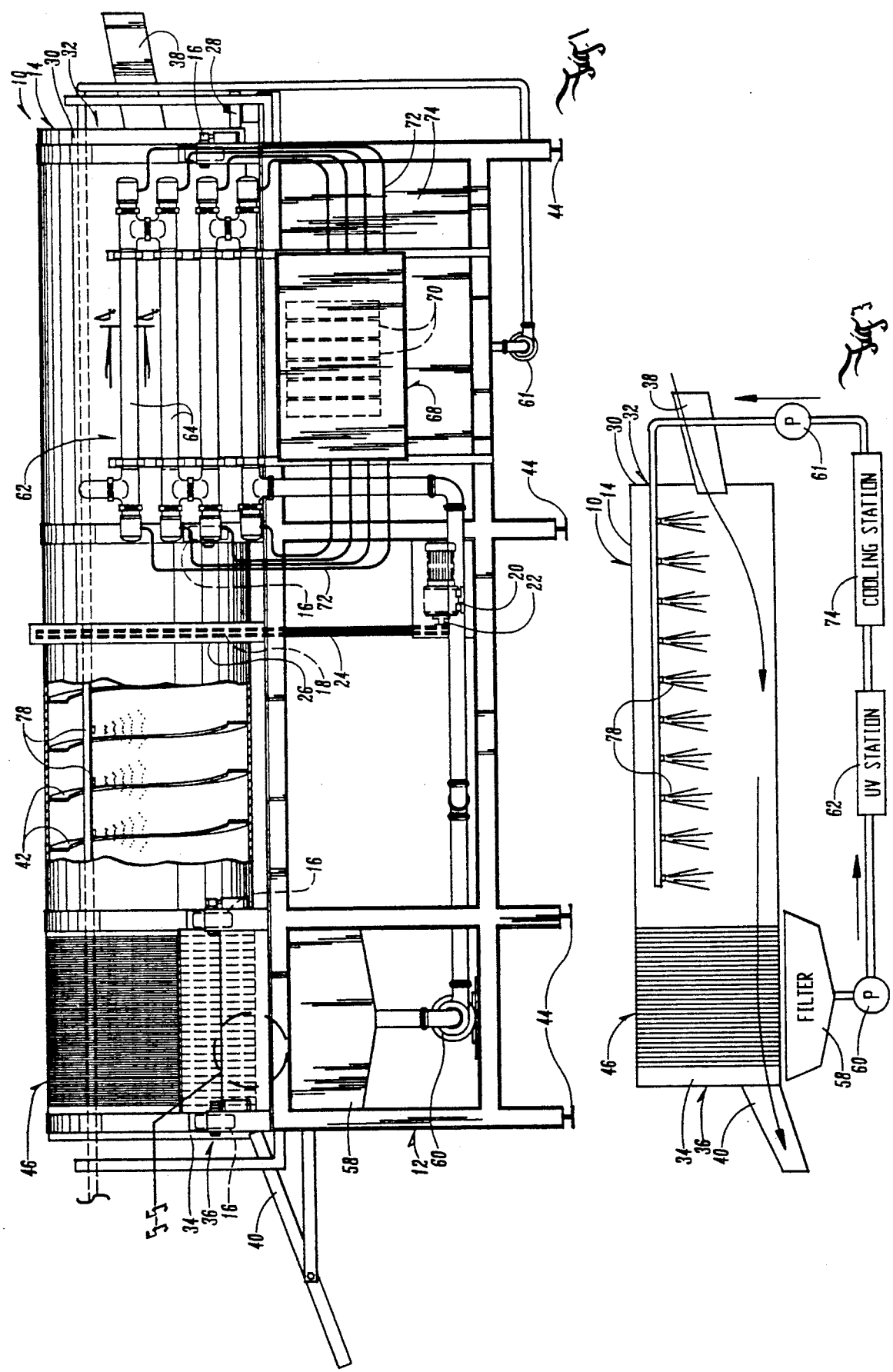
FIG. 1 is a side elevational view of the chiller of the present invention.

The chiller of the present invention is generally designated in the drawings by the reference numeral 10. Chiller 10 includes a frame 12 upon which a drum 14 is rotatably mounted. Trunnion wheels 16 are mounted upon frame 12 to rotatably support drum 14. The drum includes a sprocket 18 extending around its perimeter at approximately the longitudinal midpoint thereof. A motor 20 is mounted on frame 12 and has a sprocket connected to its drive shaft 22. A chain 24 drivingly interconnects the sprocket of motor 20 and sprocket 18 on drum 14 so that the drum is rotated upon actuation of motor 20. A housing 26 substantially covers sprocket 18 for safety purposes. Stabilizer wheels 28 prevent drum 14 from moving longitudinally as it is rotated about its longitudinal axis.

Drum 14 includes a first end 30 with an inlet opening 32 and a second end 34 having an outlet opening 36. A chute 38 extends into the inlet opening 32 for directing products to be chilled into the drum 14. An outlet chute 40 extends from the outlet opening 36 such that the chilled products can be discharged for storage or further processing.

Spiral or helical flighting 42 is fixed to the inner wall of drum 14 and serves to move the product through the drum as the drum rotates. The helical flighting 42 within the drum can be permanently mounted therein by welding or the like, or can be detachable mounted by clips or bolts so as to allow varying degrees of spiral flightings to be utilized within the drum. In one preferred flighting arrangement, the flightings are spaced four inches apart so as to create free helical sections for each longitudinal foot of drum length. Helical flighting with different spacing can be provided depending on the type of product being chilled and the length of time necessary to achieve the proper chill rate. Different products may be chilled at different rates. The speed of movement of the products through the drum by flighting 42 is directly related to the speed of rotation of drum 14.

Frame 12 has legs 44 which are vertically adjustable so that the drum can be inclined at either end 30, 34 and thereby further control the speed of movement of products through the drum. Drum 14 can be inclined up to 10–15° to enhance or inhibit the movement of products and cooling solution through the drum.

Figure 5:
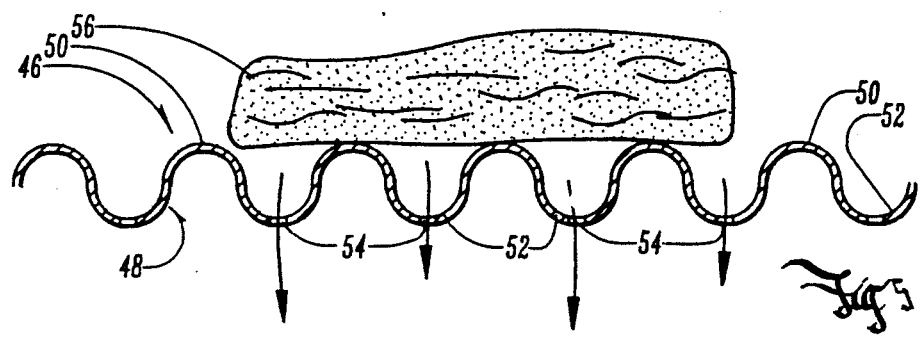
FIG. 5 is a sectional view taken along lines 5—5 of FIG. 1 showing the dewatering section of the drum.

The drum includes a dewatering section 46 adjacent to the outlet end 34. The dewatering section includes a plurality of circumferential ribs 48 defining peaks and valleys 52, as best seen in FIG. 5. A plurality of slots or apertures 54 are provided in the valleys 52 of ribs 48 through which the liquid coolant drains. The meat product is supported by the peaks so that the cooling solution is separated from the surface of the product 56 and so as to prevent plugging of the apertures 54. It is understood that the watering section can take other forms, such as construction from "Wedge Wire". Mounted on frame 12 below dewatering section 46 is a filter 58 for filtering the coolant solution drained from the dewatering section 46, thereby removing solid particles from the solution.

Figure 4:
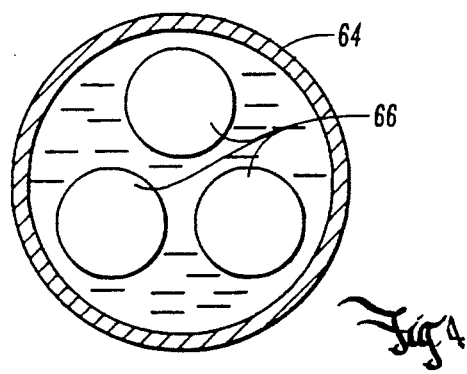
FIG. 4 is a sectional view taken along lines 4—4 of FIG. 1 showing one of the ultraviolet tubes of the present invention.

Chiller 10 also includes a pump 60 for pumping the filtered cooling solution to an ultraviolet (UV) light station 62. The UV station includes a plurality of tubes 64 connected in series. Each tube includes one or more ultraviolet lamps 66. As seen in FIG. 4, in the preferred embodiment, there are three UV lamps 66 in each tube 64. Lamps 66 are spaced closely together within tube 64 so that the coolant passing through the tube is relatively thin. For example, a preferred clearance between the lamps 66 in tube 64 is ½ inch when arranged as shown in FIG. 4.

A control panel 68 is provided with the appropriate electrical circuitry for actuating and controlling the UV lamps. Among other things, the circuitry includes a plurality of ballasts 70 as shown in broken lines in FIG. 1, for igniting lamps 66. Electrical communications are provided between the ballasts 70 and lamps 66 via wiring 72.

Figure 2:
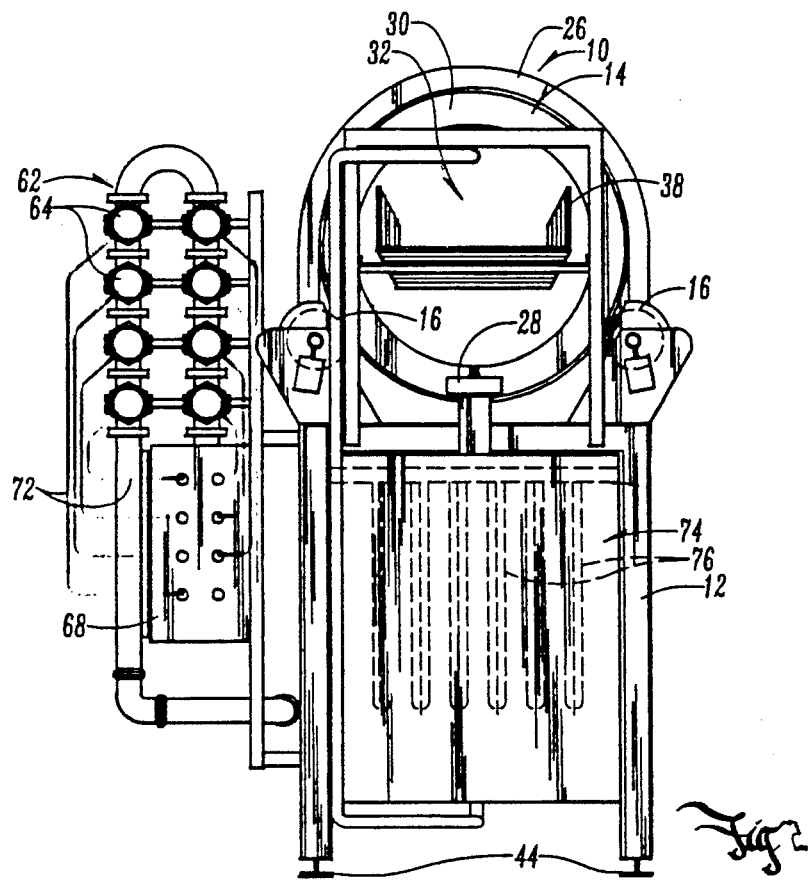
FIG. 2 is an end view of the chiller of the present invention.

Pump 60 also pumps the liquid coolant from the UV station 62 to a refrigeration or cooling station 74. A plurality of cooling plates 76 are provided in cooling station 74 as shown in broken lines in FIG. 2. After the cooling solution is recooled in the cooling stating 74, it is pumped by a second pump 61 to spray nozzle 78 positioned within drum 14 for cooling additional products in the drum 14.

In operation, motor 20 is actuated so as to rotate drum 14 about its longitudinal axis. Warm products to be chilled are introduced into the drum through the inlet opening 32 by way of inlet chute 38. Liquid coolant from the coolant station or coolant source is introduced into the drum 14 by spray nozzle 78 which extends substantially along the length of the drum. Thus, the warm products are sprayed with the chilled coolant solution and/or bathed in the solution as the product is moved through the rotating drum by flighting 42. This exposure of the products to the coolant causes heat transfer from the warm products to the cool solution, such that the products are chilled prior to discharge from the outlet opening 36. The products are dewatered in dewatering section 46 adjacent to the outlet end of the drum.

As the cooling solution moves through drum 14 in physical contact with the products being chilled, the coolant picks up solid particles and contaminants from the products. The cooling solution is drained through aperatures 54 in the dewatering section 46 of drum 14. The solution is then filtered in filter 58 so as to remove substantially all of the foreign solid particles therefrom.

The filtered solution is then pumped by pump 60, which provides up to 175 p.s.i., to the UV station 62 and through the series of UV tubes so as to be subjected to ultraviolet radiation emitted from UV lamps 66. The ultraviolet radiation purifies and disinfects the cooling solution by killing the microbial contaminants, including bacteria and fungi. Approximately 95% killing can be achieved with the proper UV dosage.

After the coolant solution has been disinfected by the UV station 62, it is pumped to the cooling station 74 for recooling, and then recirculated for re-introduction into drum 14 so as to cool additional quantities of warm products introduced into the drum.

The coolant can be any liquid having sufficient cooling capabilities, such as water, brine, or glycol. The choice of coolant depends, in part, upon the extent of chilling which is desired. Different solutions have different cooling capacities. For example, water can cool products to approximately 32° F., brine has a cooling capacity of approximately 20° F., and glycol has a cooling capacity of 0° F.

The dosage or intensity of the UV station depends on several factors, including the type of microbial contamination which needs to be killed, total plate count, the turbidity of the coolant, and the product quality. For example, different types of bacteria require different levels of ultraviolet radiation to be killed. Spores and molds require a greater dosage of UV than most bacteria.

The required intensity of the UV station is also a function of the thickness of the coolant solution, the number of lamps, the length of the lamps, and the flow rate of the solution through the UV tubes. An overdose of UV radiation is not damaging to the coolant, but an underdose does not achieve the necessary kill of the microbial contaminants. It is desirable to size the UV station so as to kill approximately 95% of the site specific microorganisms. Generally, a UV intensity of 300,000 MWS/cm$^2$ will be sufficient to kill the microbiological contaminants found in most food products.

The number of UV tubes can be increased or decreased in series, as deemed necessary to achieve the proper disinfection of the coolant solution. The germicidal UV lamps also produce a trace amount of ozone which oxidizes to produce a residual which enhances the microbial kill by slowing down reproduction.

The rate of chilling needs to be controlled so as to achieve proper reduction of the microbial contaminants. If the product is chilled too fast, the pores will set and the contaminants will become entrained in the meat. On the other hand, if the products are not sufficiently chilled, spoilage can result.

The chiller of the present invention can be quickly and easily cleaned in place. A cleaning solution can be run through the chiller system so as to provide a detergent wash, rinse, and sanitization of the drum, filter, UV station, and cooling station.

From the foregoing, it can be seen that the present invention accomplishes at least all of the stated objectives.

We claim:

1. A method of chilling products, comprising:
   introducing warm products into an elongated drum;
   introducing liquid coolant from a coolant source into the drum so as to expose the products to the coolant whereby heat is transferred form the products to the coolant thereby chilling the products to minimize spoilage thereof;
   removing the chilled products from the drum;
   draining the coolant from the drum;
   disinfecting the coolant by exposure to ultraviolet radiation so as to kill substantially all microbial contaminants in the coolant;
   adjusting the flow rate of coolant through the ultraviolet radiation so as to achieve a desired reduction of microbial contaminants;
   recirculating the coolant to the coolant source for recooling; and
   recirculating the re-cooled coolant to the drum for chilling additional products.

2. The method of claim 1 wherein the drum is rotated such that the products are tumbled therein to enhance chilling.

3. The method of claim 1 wherein the coolant is water.

4. The method of claim 1 wherein the coolant is glycol.

5. The method of claim 1 wherein the coolant is brine.

6. The method of claim 1 further comprising continuously circulating coolant through the drum, the ultraviolet radiation and the coolant source.

7. The method of claim 6 wherein the drum has an inlet opening at one end and an outlet opening at the other end, the method further comprising continuously introducing products into the drum for movement through the drum and for chilling therein.

8. The method of claim 7 wherein the products are moved through the drum by helical flighting secured within the drum.

9. The method of claim 1 wherein the coolant flows from the coolant source in a closed loop circuit back to the coolant source without addition of any substances.

10. The method of claim 1 wherein the disinfecting is accomplished only with ultraviolet radiation.

11. A chiller for chilling products, comprising:
    a container for receiving and holding the products;
    a cooling station for cooling liquid coolant;
    means for introducing liquid coolant from the coolant station into the container such that the products are exposed to and cooled by the coolant;
    means for draining the coolant from the container;
    ultraviolet radiation means for disinfecting the coolant by killing substantially all the microbial contaminant in the coolant;
    means for circulating the coolant from the ultraviolet radiation means to the cooling station for re-cooling and reintroduction into the container for cooling additional products; and
    control means for adjusting at least one of the intensity of the ultraviolet radiation and the flow rate of coolant through the ultraviolet radiation.

12. The chiller of claim 11 wherein the ultraviolet radiation means includes a plurality of ultraviolet radiation units connected in series.

13. The chiller of claim 11 wherein the container is an elongated cylindrical drum having an inlet opening at one end and an outlet opening at the other end.

14. The chiller of claim 13 further comprising means for rotating the drum such that the food products are tumbled therein.

15. The chiller of claim 11 further comprising a filter for filtering the coolant drained from the container.

16. The chiller of claim 11 wherein the circulation means includes a pump for pumping the coolant through the ultraviolet radiation means and the cooling station.

17. The chiller of claim 11 wherein the drum includes a dewatering section adjacent the outlet opening.

18. The chiller of claim 11 further comprising helical flighting mounted within the drum for moving the products through the drum as the drum rotates.

19. The chiller of claim 11 wherein the ultraviolet radiation means is the only means for reducing microbial contaminants in the coolant.

20. The apparatus of claim 11 further comprising a closed loop circuit through which the coolant flows without the addition of any additives.

21. A method of controlling microbial contaminants in a product chilling solution, the product being chilled by exposure to the solution in a container, the solution being drained from the container and then re-cooled for reintroduction to the container for chilling additional products, the method comprising:
    subjecting the solution to ultraviolet radiation so as to kill sufficient quantities of microbial contaminants int eh solution such that the solution is disinfected; and
    adjusting at least one of the intensity of the ultraviolet radiation and the flow rate of coolant through the ultraviolet radiation so as to achieve a desired reduction of microbial contaminants.

22. The method of claim 21 further comprising sampling the solution before and after subjecting the solution to the ultraviolet light to determine the total plate count of the microbial contaminants.

23. The method of claim 21 further comprising adjusting the intensity of the ultraviolet light to achieve a desired reduction of microbial contaminants.

24. The method of claim 21 further comprising adjusting the flow rate of the solution through the ultraviolet radiation so as to achieve a desired reduction in microbial contaminants.

25. The method of claim 21 further comprising adjusting the length of time that the solution is exposed to the ultraviolet light so as to achieve a desired reduction of microbial contaminants.

26. The method of claim 21 wherein the solution is subjected to the ultraviolet radiation after drainage from the drum and prior to re-introduction in the drum.

27. The method of claim 21 wherein the coolant flows from the coolant source in a closed loop circuit back to the coolant source without addition of any substances.

28. The method of claim 21 wherein the disinfecting is accomplished only with ultraviolet radiation.

29. A method of chilling products, comprising:
    introducing warm products into an elongated drum;
    introducing liquid coolant from a coolant source into the drum so as to expose the products to the coolant whereby heat is transferred from the products to the coolant thereby chilling the products to minimize spoilage thereof;
    removing the chilled products from the drum;
    draining the coolant from the drum;

disinfecting the coolant by exposure to ultraviolet radiation so as to kill substantially all microbial contaminants in the coolant;

sampling the solution before and after subjecting the coolant to the ultraviolet radiation to determine the total plate count of the microbial contaminants;

recirculating the coolant to the coolant source for recooling; and recirculating the re-cooled coolant to the drum for chilling additional products.

30. The method of claim 29 further comprising continuously circulating coolant through the drum, the ultraviolet radiation and the coolant source.

31. The method of claim 29 wherein the coolant flows from the coolant source in a closed loop circuit back to the coolant source without addition of any substances.

32. The method of claim 29 wherein the disinfecting is accomplished only with ultraviolet radiation.

33. A method of chilling products, comprising:

introducing warm products into an elongated drum;

introducing liquid coolant from a coolant source into the drum so as to expose the products to the coolant whereby heat is transferred form the products to the coolant thereby chilling the products to minimize spoilage thereof;

removing the chilled products from the drum;

draining the coolant from the drum;

disinfecting the coolant by exposure to ultraviolet radiation so as to kill substantially all microbial contaminants in the coolant;

adjusting the intensity of the ultraviolet radiation to achieve a desired reduction of microbial contaminants.

recirculating the coolant to the coolant source for recooling; and recirculating the re-cooled coolant to the drum for chilling additional products.

34. The method of claim 33 further comprising continuously circulating coolant through the drum, the ultraviolet radiation and the coolant source.

35. The method of claim 33 wherein the coolant flows from the coolant source in a closed loop circuit back to the coolant source without addition of any substances.

36. The method of claim 33 wherein the disinfecting is accomplished only with ultraviolet radiation.

* * * * *